(12) United States Patent
Yoon (10) Patent No.: US 9,284,944 B2
(45) Date of Patent: Mar. 15, 2016

(54) VERTICAL SHAFT TYPE DARIUS WINDMILL

(75) Inventor: Yang Il Yoon, Gwangju (KR)

(73) Assignee: CYGNUS POWER CO., LTD, Gwangju (KR)

( * ) Notice: Subject to any disclaimer, the term of this patent is extended or adjusted under 35 U.S.C. 154(b) by 224 days.

(21) Appl. No.: 12/989,956

(22) PCT Filed: Jul. 31, 2009

(86) PCT No.: PCT/KR2009/004313
§ 371 (c)(1),
(2), (4) Date: Oct. 27, 2010

(87) PCT Pub. No.: WO2010/013981
PCT Pub. Date: Feb. 4, 2010

(65) Prior Publication Data
US 2011/0042962 A1    Feb. 24, 2011

(30) Foreign Application Priority Data
Jul. 31, 2008    (KR) .......................... 10-2008-0075358

(51) Int. Cl.
*F03D 9/00* (2006.01)
*H02P 9/04* (2006.01)
*F03D 3/06* (2006.01)

(52) U.S. Cl.
CPC ....................................... *F03D 3/061* (2013.01)

(58) Field of Classification Search
USPC .................. 290/44, 55; 415/2.1, 4.1, 4.3, 4.5; 416/132 B, DIG. 2
See application file for complete search history.

(56) References Cited

U.S. PATENT DOCUMENTS

| 4,236,866 A | * | 12/1980 | Zapata Martinez | 415/4.4 |
| 4,449,053 A | * | 5/1984 | Kutcher | 290/44 |
| 4,551,631 A | * | 11/1985 | Trigilio | 290/55 |
| 5,380,149 A | * | 1/1995 | Valsamidis | 415/2.1 |
| 5,463,257 A | * | 10/1995 | Yea | 290/55 |
| 5,664,418 A | * | 9/1997 | Walters | 60/398 |

(Continued)

FOREIGN PATENT DOCUMENTS

| JP | 55-081280 | 6/1980 |
| JP | 09-287549 | 11/1997 |

(Continued)

OTHER PUBLICATIONS

International Search Report for PCT/KR2009/004313 mailed Apr. 1, 2010.

*Primary Examiner* — Julio Gonzalez
(74) *Attorney, Agent, or Firm* — Aliki K. Collins; AKC Patents LLC (57) ABSTRACT

The present invention relates to a Darrieus windmill, and more specifically, to a vertical axis type Darrieus windmill that enables self-start in the low wind velocity range. The Darrieus windmill, in which a primary vertical shaft is rotated by the lift forces generated by primary blades, has a starting means for assisting the starting or rotation of the primary shaft at a low wind velocity. The present invention provides advantages of enabling self-start and rotation due to the lift generated by the blade in low wind velocity conditions and enabling the generation of rotating moments in any wind direction or wind velocity, thereby easily starting even in urban areas with very low wind velocities or large variations in wind direction, and thus enabling the generation of electricity over a wide range of wind velocities.

8 Claims, 7 Drawing Sheets

(56) References Cited

U.S. PATENT DOCUMENTS

| | | | |
|---|---|---|---|
| 6,787,934 B2* | 9/2004 | Parviainen | 290/55 |
| 7,362,004 B2* | 4/2008 | Becker | 290/55 |
| 8,030,792 B2* | 10/2011 | Haar | 290/44 |
| 8,215,897 B2* | 7/2012 | Douglass et al. | 415/4.2 |
| 2005/0099013 A1* | 5/2005 | Noguchi | 290/55 |
| 2007/0029807 A1* | 2/2007 | Kass | 290/55 |
| 2009/0116968 A1* | 5/2009 | Mohle | 416/241 R |
| 2009/0140528 A1* | 6/2009 | Ireland | 290/55 |
| 2010/0133829 A1* | 6/2010 | Bertenyi | 290/44 |
| 2010/0232965 A1* | 9/2010 | Chang | 416/169 R |
| 2010/0308597 A1* | 12/2010 | Gyorgyi | 290/55 |
| 2011/0025071 A1* | 2/2011 | Cortesi et al. | 290/55 |
| 2011/0037271 A1* | 2/2011 | Sheinman | 290/55 |

FOREIGN PATENT DOCUMENTS

| | | | |
|---|---|---|---|
| JP | 09287549 A | * | 11/1997 |
| JP | 2006-161797 | | 6/2006 |
| JP | 2006-300028 | | 11/2006 |
| KR | 10-0637297 | | 10/2006 |

* cited by examiner

VERTICAL SHAFT TYPE DARIUS WINDMILL

RELATED APPLICATIONS

This application is a 371 application of International Application No. PCT/KR2009/004313, filed Jul. 31, 2009, which in turn claims priority from Korean Patent Application No. 10-2008-0075358, filed Jul. 31, 2008, both of which are incorporated herein by reference in their entireties.

TECHNICAL FIELD

The present invention relates to a Drarrieus windmill, in more detail a vertical axis type Drarrieus windmill that can self-start in a low air speed range.

BACKGROUND TECHNOLOGY

In general, windmills convert rotational energy of blades rotated by natural wind into electricity by an electric generator.

This is called wind power generation and they are classified into two types, according to the direction of rotational axis or the turbine, as HAWT (horizontal axis wind turbine) of which rotational axis is horizontal to the ground, and VAWT (vertical axis wind turbine) of which rotational axis is vertical to the ground.

And according to the sources of rotational force, the wind turbines can be classified into two types, as lift type and drag type. In lift type the blades are turned with the tangential components of lift forces generated on the blades, as the Darrieus type or the gyromill type. In drag type, the blades are turned by the drag forces, as a paddle type or Savonius type.

One of the problems in the case of drag type of VAWT is that, when the tip speed ratio (ratio of tangential speed of blade and natural wind speed, TSP) reaches 1, the increase in the wind speed cannot increase the rotational speed and as the result, the generating efficiency is low. But with the drag type, it is relatively easy to start the blade to move even with the lower wind speed.

In the lift type, when TSP is higher than 1, the aerodynamic efficiency of the turbine improves as the result of improved aerodynamic performance of the blades; however, when TSP is lower than 1, the aerodynamics performance of the windmill is worsened and the rotating moment of the blades are reduced. And because of the reduced rotating moment, it becomes difficult to start the blades to rotate from the stationary condition.

Therefore, there have been efforts to combine the advantages of drag type and lift type to make windmills to start at low wind speed and to have higher efficiency at the same time.

Such a hybrid type windmill is disclosed in Japanese Patent Publication No. 2003-314432.

The above mentioned windmill is achieved by integrally connect a Savonius windmill, that is a drag type, to the shaft of a Darrieus windmill, that is a lift type, such that rotation is started by the Savonius windmill and then high rotation speed is reached by the Darriues windmill.

However, in the above mentioned hybrid windmill, though the Savonius windmill can starts the DARRIEUS wind mill to rotate at low wind speed, as the rotating speed increases the Savonius windmill hinders the rotating movement of Darrieus windmill, and as the result, the efficiency of the whole system becomes lower than the case of Darrieus windmill only.

DISCLOSURE

Technical Problem

The present invention has been made to solve the above mentioned problems and it is an object of the present invention to provide a Darrieus windmill that can start by itself at a low wind speed range while maintaining the advantages of the Darrieus windmill's high efficiency of power generation, due to its excellent aerodynamics characteristics at high wind speed range.

It is another object of the present invention to provide a Darrieus windmill having increased power generation capacity without reducing the number of revolution, as compared with the existing DARRIEUS windmill, at high wind speed range.

Technical Solution

In order to achieve the objects of the present invention, the present invention provides a Darrieus windmill equipped with a primary vertical shaft and a plurality of primary blades fixed to the primary shaft, generating rotating moment by means of lift force, in which the starting means are provided by means of wind force.

It is preferable that above mentioned starting means are provided by drag forces generated at the cut-off section provided on the primary shaft-facing surface of the primary blades, or by drag forces generated by the secondary blades attached to supporting arms which are extended radially from the primary shaft and attached to the outer surface of the primary shaft.

It is preferable that the second blades have airfoil sections and have cut-off sections formed by cutting off portion of the primary shaft-facing surfaces, and that the above-mentioned starting means are provided by the combined rotating forces of the primary and secondary shafts at low wind speed, and that at higher wind speed, two shafts are separated and rotate independently from each other.

Further, it is preferable that the primary shaft is disposed coaxially in the secondary shaft, which is a hollow member, and a one-way clutch is disposed between the secondary shaft and the primary shaft, and the above-mentioned starting means are provided by the drag forces generated by the secondary blades formed helically around the primary shaft and attached to supporting arms which are extended radially from the primary shaft and attached to the outer surface of the primary.

Above-mentioned starting means may further have a plurality of the secondary blades attached to supporting arms which are extended radially from the primary shaft and attached to the outer surface of the primary shaft.

The present invention provides a Darrieus windmill equipped with a vertical primary shaft and primary blades, having airfoil section, symmetrically disposed around the primary shaft, having the upper and the lower ends fixed to fixing portions disposed at the upper and the lower portion of the primary shaft, and having formed arc, in which starting means are included which is provided by drag forces generated at the cut-off section provided on the primary shaft-facing surface of the primary blades.

Advantageous Effects

As described above, the present invention can self-start at low wind speed by the drag forces generated at the blades and can generate electricity.

Further, since it is possible to generate rotating moment with wind from any directions and any speed, the windmill can easily operate in city areas where wind speed is very low and wind directions vary rapidly, and can generate electricity in a wide range of wind speeds.

Further, the present invention can exploit the advantages of the Darrieus windmill having excellent aerodynamics characteristics in high wind speed region with high speed rotation made possible by means of lift forces.

Further, it is possible to connect the primary shaft with the secondary shaft, using a one-way clutch such that they rotate together at low wind speed and rotate independently from each other at high wind speed. Therefore, it is possible to significantly increase power generation capacity by individually connecting power generators to each shaft.

REFERENCE NUMERALS

20: SECONDARY BLADE
27: SUPPORT ARM
31: PRIMARY BLADE
35: PRIMARY SHAFT
45: SECONDARY SHAFT
80: ONE-WAY CLUTCH

MODE FOR INVENTION

Hereinafter, a Darrieus windmill according to preferred embodiments of the present invention is described in detail with reference to the accompanying drawings.

Figure 1:
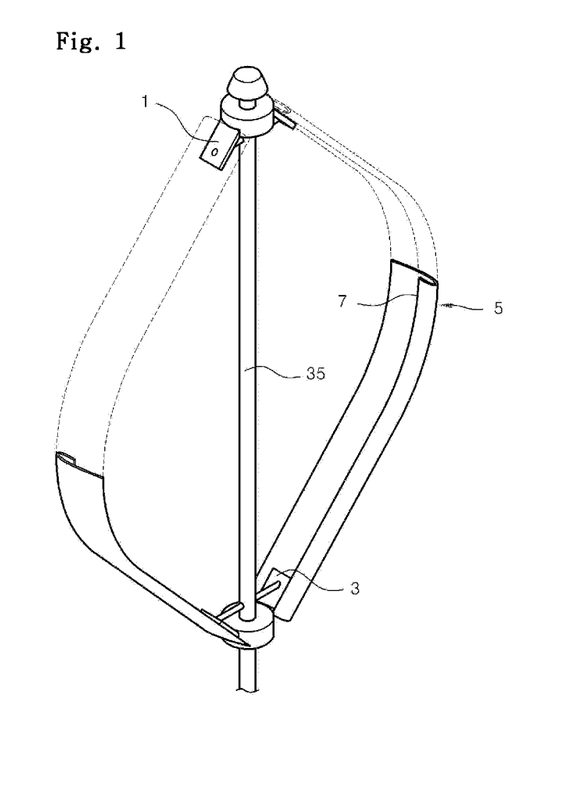
FIG. 1 is a perspective view showing a Darrieus windmill according to an embodiment of the present invention.
Figure 2:
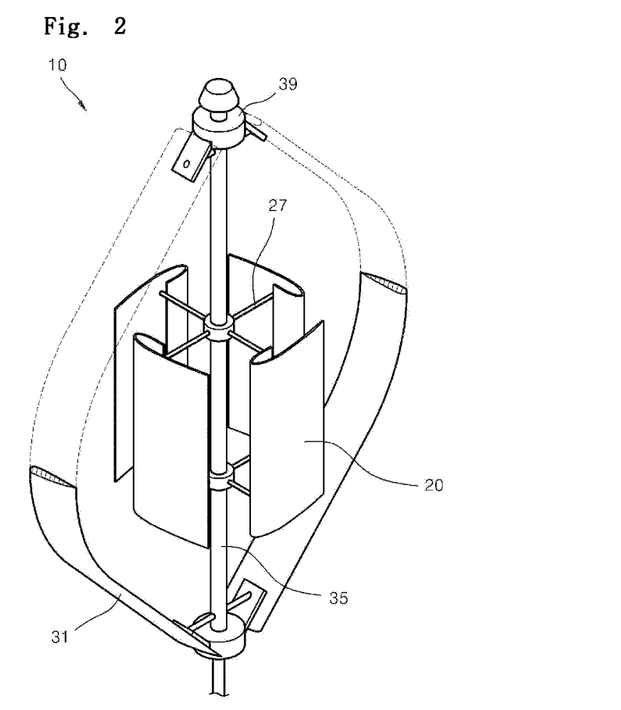
FIG. 2 is a perspective view showing a Darrieus windmill according to another embodiment of the present invention.
Figure 3:
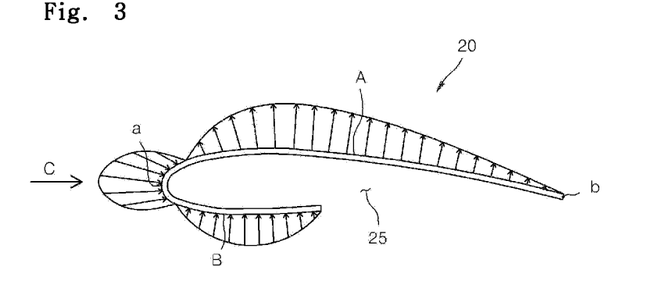
FIG. 3 is a view showing pressure distribution around a cross second of the blade used in FIG. 2.
Figure 4:
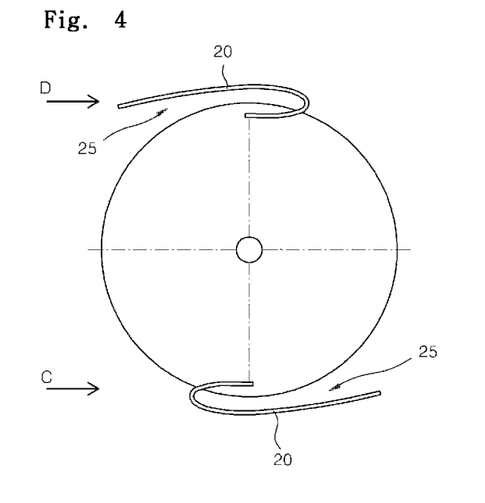
FIG. 4 is a view showing rotation of the secondary blade used in FIG. 2.
Figure 5:
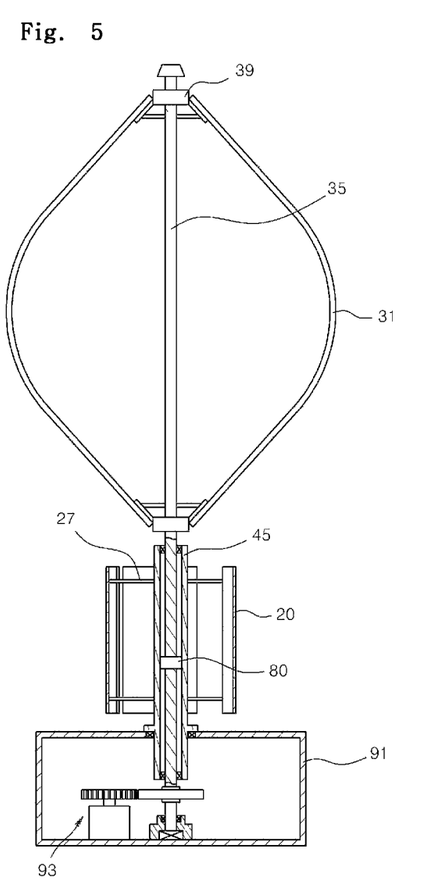
FIG. 5 is a cross-sectional view showing a Darrieus windmill according to another embodiment of the present invention.
Figure 6:
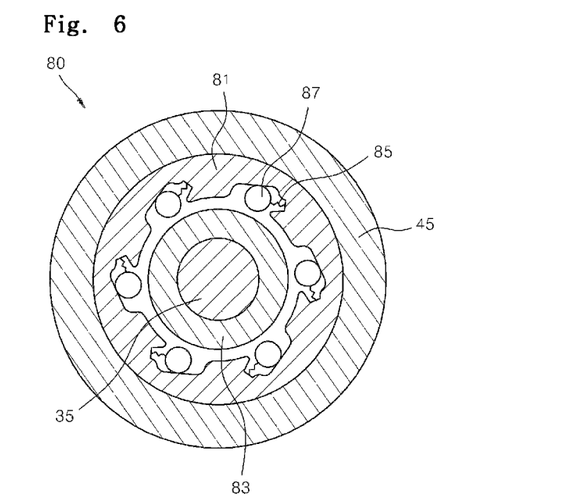
FIG. 6 is a cross-sectional view showing the structure of a one-way clutch used in FIG. 5.
Figure 7:
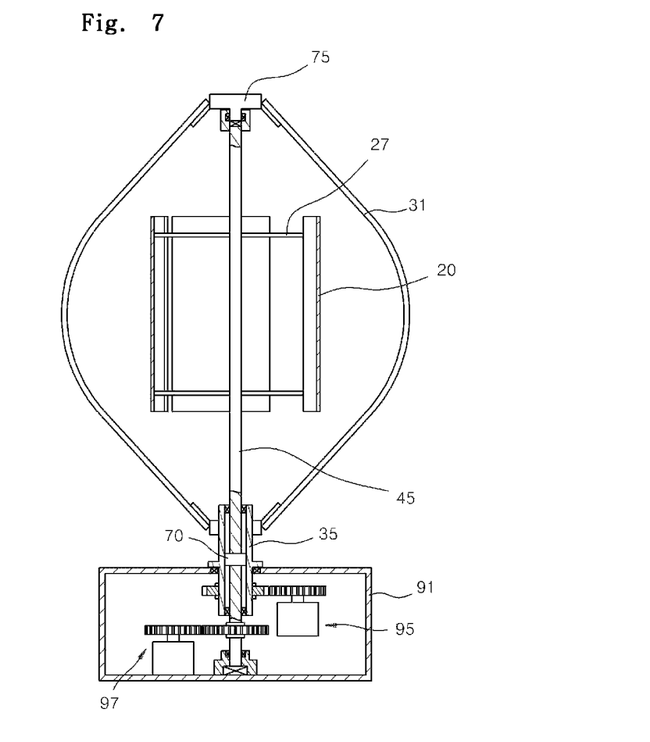
FIG. 7 is a cross-sectional view showing a Darrieus windmill according to another embodiment of the present invention.
Figure 8:
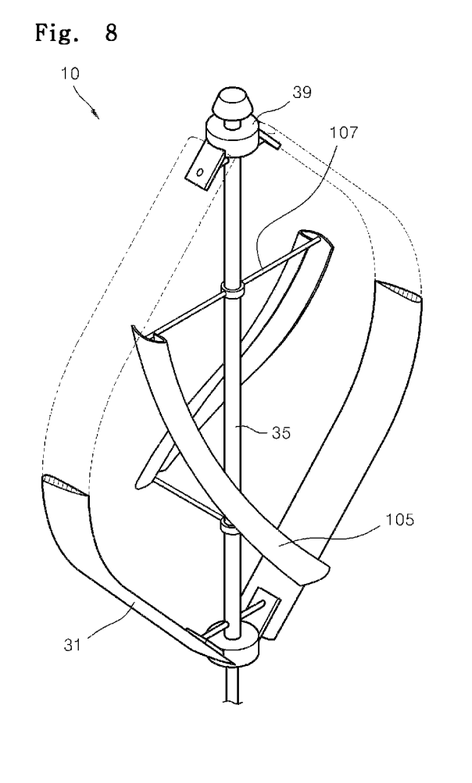
FIGS. 8 and 9 are perspective views showing a Darrieus windmill according to another embodiment of the present invention.
Figure 9:
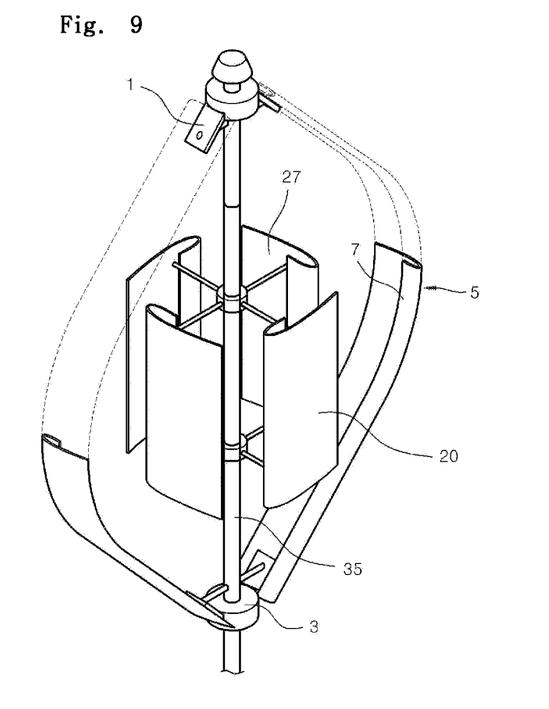

FIG. 1 is a perspective view showing a Darrieus windmill according to an embodiment of the present invention, FIG. 2 is a perspective view showing a Darrieus windmill according to another embodiment of the present invention, FIG. 3 is a view showing pressure distribution around a secondary blade used in FIG. 2, FIG. 4 is a view showing rotation of the secondary blades used in FIG. 2, FIG. 5 is a cross-sectional view showing a Darrieus windmill according to another embodiment of the present invention, FIG. 6 is a cross-sectional view showing the structure of a one-way clutch used in FIG. 5, FIG. 7 is a cross-sectional view showing a Darrieus windmill according to another embodiment of the present invention, and FIGS. 8 and 9 are perspective views showing a Darrieus windmill according to another embodiment of the present invention.

The most important feature of the Darrieus windmill of the present invention is to have a starting means for self-starting at low wind speed.

A Darrieus windmill having a starting means according to an embodiment of the present invention is described with reference to FIGS. 2 to 4 first. The present invention has a hybrid type windmill structure where a secondary windmill assisting the primary windmill is combined with a primary windmill, the Darrieus windmill.

The primary windmill is a conventional Darrieus windmill. The shown primary windmill, for example, is composed of a vertical primary shaft 35 and two primary blades 31 connected to the primary shaft 35. The upper and the lower end of the primary blade 31 are fixed to the fixing portions 39 disposed at the upper and lower end portions of the primary shaft 35. The number of primary blades 31 may be three, unlike those shown in the figures. The primary blades are arranged symmetrically about the primary shaft 35. Further, though not shown, the lower end of the primary shaft 35 is connected with a power generator.

The primary blade 31 has a generally arc shape and a streamlined airfoil cross-section such that the primary shaft 35 is rotated by lift forces generated on the blade surfaces. The primary blade 31 used for the primary windmill can rotate with high number of revolution, because aerodynamics characteristics of the windmill are improved in a high wind speed range above a tip speed ratio (ratio of tangential speed of blade and natural wind speed, TSP) of one. Further, the primary shaft 35 is not affected by wind directions, because it is vertical.

The primary blade 31, however, cannot start by itself below a tip speed ratio of 1, such that it cannot rotate the primary shaft. Therefore, the problem is that it is impossible to generate electricity in a low wind speed range.

Therefore, the secondary blades are provided as starting means for the primary shaft 35 in the present invention. The secondary blades generate rotating moment by means of drag at low wind speed and also generate rotating moment by means of lift at high wind speed. The secondary blades exert almost no load to the primary blades 31 rotating at high speed at high wind speed, by starting the primary shaft 35 by means of drag at low wind speed and rotating at high speed by means of lift at high wind speed, such that it is possible to use the advantages of the primary blades having excellent aerodynamics characteristics in a high wind speed range.

Since in conventional hybrid windmills manufactured by combining a Savonius windmill with a Darrieus windmill, the Darrieus windmill rotates the Savonius windmill in a high wind speed range, the speed of the Darrieus windmill is reduced and power is lost; however, according to the present invention, power is lost very little at high wind speed by the secondary blades rotated by the lift.

A plurality of support arms 27 radially extending and perpendicular to the primary shaft 35 is formed on the outer circumference of the upper and lower portions of the primary shaft 35, and is in the rotational range of the primary blades 31. Further, the secondary blades 20 are attached to the ends of the four support arms 27, respectively, along a circumference having a predetermined radius in a plan perpendicular to the primary shaft 35.

The secondary blade 20 is manufactured by press-forming a thin metal plate, such as an aluminum alloy, or extrusion-molding resin. The secondary blade 20 has a cross-section of a streamlined airfoil shape used for airplanes typically a 4-number series airfoil, an RAF airfoil, and a Geottingen airfoil, and it has a cut-off portion 25 formed on the lower surface B facing the primary shaft 35. The cut-off portion 25 is formed from the leading edge (a) to the trailing edge (b) at a position of 35% to 45% of the chord from the leading edge (a). As a result, the secondary blade 20 has an airfoil having a large lift coefficient at a low Reynolds number.

Pressure distribution caused by the wind from the frontal area (in the direction of an arrow C), is formed around the secondary blade 20 as shown in FIG. 3. That is, in the airfoil used for the secondary blade 20, pressure larger than the external atmospheric pressure is distributed at the front portion of the secondary blade 20, pressure substantially the same as the external atmospheric pressure is distributed at the rear portion, and negative pressure is distributed on the upper surface, because the flow speed is increased on the upper surface according to the shape of the air foil and accordingly the pressure is reduced. Therefore, the aerodynamics characteristics of the airfoil is affected little, even if the cut-off section 25 is formed at the rear portion of the lower surface of the secondary blade 20.

Further, as shown in FIG. 4, lift is generated when the secondary blade 20 is attacked by wind from the frontal area (in the direction of an arrow C), such that the secondary blade 20 is rotated clockwise by the tangential component of the lift generated on the secondary blade 20.

Further, in a low wind speed range, such as starting, when the secondary blade 20 is attacked by wind from the rear (in the direction of an arrow D in the figure), large air resistance is generated in the secondary blade 20 by the cut-off portion 25 of the secondary blade 20. Accordingly, rotating moment is generated in the secondary blade 20 by the Savonius-effect, that is, the air resistance, such that the starting torque is generated in the windmill.

As a result, since the cut-off portion 25 is formed on the inner surface of the secondary blade 20, rotational moment is generated by the air resistance in the low wind speed range below a tip speed ratio of 1, against the wind flowing in the direction of an arrow D of FIG. 4.

Further, the moment generates rotation by being added to the tangential component of the lift generated on the secondary blade 20 attacked by the wind in the direction of an arrow C of FIG. 4, and the secondary blade 20 is rotated by the lift generated on the secondary blade in a high wind speed range above a tip speed ratio of 1. That is, since the secondary blade 20 has the airfoil having a high lift coefficient at a low Reynolds number, the secondary blade 20 can be rotated at low wind speed below 1 m/sec, such that it is possible to efficiently generate electricity. Further, since the secondary blade is made of a light material, such as an aluminum alloy, the entire weight of the secondary blade decreases and the load exerted on the secondary blades 20 by the centrifugal force is reduced.

Further, since the embodiment uses the secondary blade type having a high lift coefficient at a low Reynolds number, the air resistance and lift force are generated in the secondary blade 20 and the secondary blade 20 is rotated by those forces. Therefore, it is possible to obtain rotating moment required to generate electricity from the secondary blade 20 even at any wind direction and speed. As a result, it is possible to rotate the secondary blade 20 in a wide wind speed range.

Further, since four secondary blades 20 are disposed around the primary shaft 35 to efficiently rotate the secondary blades against the wind from all directions, it is possible to install the windmill in large cities where wind directions frequently change, because it is possible to generate electricity by rotating the primary shaft 35 against all wind, regardless of the wind directions.

Although four secondary blades 20 are disposed in the embodiment described above, the number of secondary blades is not limited thereto, and three or less, five or more blades may be used and it is possible to achieve the same operation and effect as the embodiment described above even in those cases.

According to the Darrieus windmill 10 of the present invention, as described above, the primary shaft 35 is rotated by starting the secondary blades at low wind speed. Further, when the wind speed increases and reaches a high wind speed range, the shaft can be rotated at high speed by the lift-typed primary blades 31. In this case, since the secondary blades 20 can be rotated at high speed by the lift, they give very little load to the first blades rotating at high speed in the high speed region, such that the efficiency of generating electricity is not much reduced.

Meanwhile, although the secondary blades 20 are vertically disposed in the embodiment described above, the secondary blades 105 may be helically twisted about the primary shaft 35, as shown in FIG. 8. The helical secondary blades 105 are fixed to the supports 107 horizontally attached to the outer circumference of the primary shaft 35.

The aerodynamic characteristics are spirally exerted in the secondary blades 105, such that the secondary blades 105 can easily rotate against various wind directions and the starting performance of the primary shaft 35 can be improved.

Further, referring to FIGS. 5 and 6 which show another embodiment of the present invention, a secondary shaft 45 equipped with the secondary blades 20 is separately installed coaxially with the primary shaft. The secondary shaft 45 rotates with the primary shaft 35 at low wind speed, while it is detached from the primary shaft 35 and independently rotates from the primary shaft at a high wind speed.

The primary shaft 35 having the lower portion connected with a power generator 93 is vertically disposed and lift-typed primary blades 31 are fixed to the primary shaft 35. Further, the secondary shaft 45 surrounding the outer circumference of the primary shaft 35 which is positioned at the lower portion in the rotational region of the primary blades 31 is disposed coaxially with the primary shaft 35. In this structure, the secondary shaft 45 is supported by a housing 91 which enables the secondary shaft 45 to rotate. The primary shaft 35 is inserted through the center of the secondary shaft 45, which is a hollow member, in which the inner circumference of the secondary shaft has a clearance from the outer circumference of the primary shaft.

Further, a one-way clutch 80 that can rotate in only one direction is disposed between the inner circumference of the secondary shaft 45 and the outer circumference of the primary shaft 35. An inner rotator 83 of the one-way clutch 80 is engaged with the primary shaft 35 and an outer rotator 81 is engaged with the secondary shaft 45.

Therefore, as the secondary shaft 45 is rotated clockwise by the drag force generated in the secondary blades 20 in a low speed range, a roller 87 supported by a spring 85 moves opposite direction to the spring while the outer rotator 81 contacts and presses the inner rotator 83. Therefore, the primary shaft 35 rotates engaged with the secondary shaft 45.

Further, when the wind speed increases and reaches a high wind speed range, the roller 87 supported by the spring of the one-way clutch moves toward the spring 85 and the outer rotator 81 moves away from the inner rotator 83, as shown in FIG. 6, when the number of revolution of the primary shaft 35 is increased higher than that of the secondary shaft 45 by the high-speed rotation of the primary blades 31, such that the primary shaft 35 is disengaged from the secondary shaft 45 and independently rotates.

Further, when the rotational speed decreases, the primary shaft is engaged and rotated with the secondary shaft by the action of the one-way clutch 80.

As described above, the primary and secondary shafts have different rotational speed at the high wind speed range, particularly, when the rotational speed of the primary shaft 35 is higher than that of the secondary shaft 45, the load of the primary shaft 35 for rotating the secondary shaft 45 is removed, such that the efficiency of generating electricity of the primary shaft 35 is not reduced.

According to another embodiment of the present invention, as shown in FIG. 7, the secondary blades 20 are positioned within the rotational region of primary blades 31. In this case, a primary shaft 35 where the lower ends of the primary blades 31 are fixed is rotatably and vertically disposed in a housing 91. Further, a secondary shaft 45 where the secondary blades 20 are fixed is coaxially disposed through the center of the primary shaft 35, which is a hollow member, and extends at a predetermined distance from both ends of the primary shaft 35.

Power generators 95, 97 are connected to the lower portions of the primary shaft 35 and the secondary shaft 45, respectively, and the secondary blades 20 supported by support arms 27 are connected to the secondary shaft 45. Further, a circular-plate shape rotary bracket 75 that can rotate individually from the secondary shaft 45 is disposed on the top of the secondary shaft 45, and the upper ends of the primary blades 31 are fixed to the rotary bracket 75 and the lower ends are fixed to the outer circumference of the primary shaft 35. Further, a one-way clutch 70 is combined with the primary shaft 35 and the secondary shaft 45.

Therefore, when the wind speed reaches a high wind speed range, the primary shaft is separated from the secondary shaft 45 and generates electricity while independently rotating. Further, since the individual power generator 97 is connected to the secondary shaft 45, the present invention can considerably improve the power generation capacity, because the primary shaft 35 and the secondary shaft 45 generate electricity independently.

Further, FIG. 1 shows a Darrieus windmill according to another embodiment of the present invention. Referring to FIG. 1, the present invention is characterized by improvement of the conventional Darrieus blades to implement self-starting function in a low wind speed range.

Both ends of the primary blades 5 are fixed to fixing portions 39 formed at the upper and lower portions of a vertical primary shaft 35. Other than two, three or four primary blades 5 may be disposed. The primary blade 5 has a cross-section of a streamlined airfoil and a cut-off portion 7 formed on the inner surface facing the primary shaft 35. Since the cut-off portion 7 has the same operation and effect as the secondary blades shown in FIG. 2, the detailed description is omitted.

Large air resistance is exerted on the primary blade 5 having the above structure by the cut-off portion 7 at a low wind speed range. Rotating moment is generated on the primary blade 5 by the air resistance, such that starting torque for the windmill is thus generated and the windmill starts by itself.

Further, as shown in FIG. 9, secondary blades 20 with cut-off potions 7 attached to primary shaft 35 may be further included as starting means. In this structure, the configuration of the secondary blade 20 is the same as that of the secondary blade shown in FIG. 2.

Although the present invention has been described with references to the embodiments shown in the drawings, they are just examples and it should be understood that various modifications and equivalents may be achieved from the present invention by those skilled in the related technology.

Therefore, the spirit of the present invention should be construed on the basis of claims.

INDUSTRIAL APPLICABILITY

According to a vertical axis type Darrieus windmill of the present invention, the windmill can start by itself by means of drag exerted on the blades in a low wind speed range.

The invention claimed is:

1. A Darrieus windmill equipped with a vertical primary shaft and a plurality of primary blades fixed to the primary shaft and generating rotating moment by means of lift force, the Darrieus windmill comprising starting means that are formed at the primary shaft or the primary blades and starts the primary shaft by means of wind force, wherein the starting means comprises secondary blades, wherein each of the secondary blades comprises a first portion extending in a first direction, a bending portion extending from the first portion, and a second portion extending from the bending portion in a second direction, wherein the first and second directions are opposite so that the first and second portions face each other, wherein the first portion has a length larger than a length of the second portion; and the second portion is nearer to the primary shaft than the first portion; and further comprising a plurality of support arms radially extending from the outer circumference of the primary shaft wherein the secondary blades are fixed to the support arms, respectively, and wherein the secondary blades generate rotating moment by means of a drag force.

2. The Darrieus windmill according to claim 1, further comprising a vertical secondary shaft that is connected with the primary shaft to rotate together at low wind speed and that separates from the primary shaft to independently rotate from the primary shaft at high wind speed, a plurality of support arms that radially extend from the outer circumference of the secondary shaft, wherein the secondary blades are fixed to the support arms, respectively, and generate rotating moment by means of drag force.

3. The Darrieus windmill according to claim 2, wherein the primary shaft is disposed coaxially in the secondary shaft, which is a hollow member, and a one-way clutch is disposed between the secondary shaft and the primary shaft.

4. The Darrieus windmill according to claim 1, further comprising a plurality of support arms radially extending from the outer circumference of the primary shaft, wherein the secondary blades are helically formed around the primary shaft and fixed to the support arms, respectively, to generate rotating moment by means of drag force.

5. The Darrieus windmill according to claim 1, further comprising a plurality of support arms radially extending from the outer circumference of the primary shaft, wherein the secondary blades are fixed to the support arms, respectively, to generate rotating moment by means of drag force.

6. The windmill of claim 1, wherein each of the primary blades has a cross-section in an airfoil shape.

7. The windmill of claim 1, wherein each of the primary blades has upper and lower ends fixed to upper and lower portions of the primary shaft, respectively.

8. The windmill of claim 7, wherein each of the primary blades is formed in an arc shape.

\* \* \* \* \*